(12) United States Patent
Zhang et al.

(10) Patent No.: US 11,436,434 B2
(45) Date of Patent: Sep. 6, 2022

(54) MACHINE LEARNING TECHNIQUES TO IDENTIFY PREDICTIVE FEATURES AND PREDICTIVE VALUES FOR EACH FEATURE

(71) Applicant: Microsoft Technology Licensing, LLC, Redmond, WA (US)

(72) Inventors: Yunjing Zhang, Sunnyvale, CA (US); Yan Liu, Santa Clara, CA (US); Boyu Zhang, San Francisco, CA (US); Song Lin, Santa Clara, CA (US); Kuo-Ning Huang, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 442 days.

(21) Appl. No.: 16/726,252

(22) Filed: Dec. 24, 2019

(65) Prior Publication Data

US 2021/0192280 A1 Jun. 24, 2021

(51) Int. Cl.
*G06K 9/62* (2022.01)
*G06N 7/00* (2006.01)
*G06N 20/20* (2019.01)

(52) U.S. Cl.
CPC ........... *G06K 9/6256* (2013.01); *G06N 7/005* (2013.01); *G06N 20/20* (2019.01)

(58) Field of Classification Search
None
See application file for complete search history.

(56) References Cited

U.S. PATENT DOCUMENTS

| | | | |
|---|---|---|---|
| 10,366,346 B2 * | 7/2019 | Achin | G06N 20/00 |
| 10,692,114 B1 * | 6/2020 | Andersen | G06Q 30/0275 |
| 2021/0232954 A1 * | 7/2021 | Monaghan | G06K 9/6232 |

* cited by examiner

*Primary Examiner* — Abdhesh K Jha
(74) *Attorney, Agent, or Firm* — Nicholson De Vos Webster & Elliott LLP

(57) ABSTRACT

Techniques are provided for using machine learning techniques to identify predictive features and predictive values for each feature. In one technique, a model is trained based on training data that comprises training instances, each of which corresponds to multiple usage-based features of an online service by a user. For each usage-based feature in a subset of the usage-based features, the model is used to generate a dependency graph, a histogram is generated, and an optimized value is selected based on the dependency graph and the histogram. A user of the online service is identified, along with a usage value that indicates a level of usage, by the user, of a usage-based feature. A comparison between the usage value and an optimized value of the usage-based feature is performed. Based on the comparison, it is determined whether to present data about that usage-based feature to the user.

20 Claims, 5 Drawing Sheets

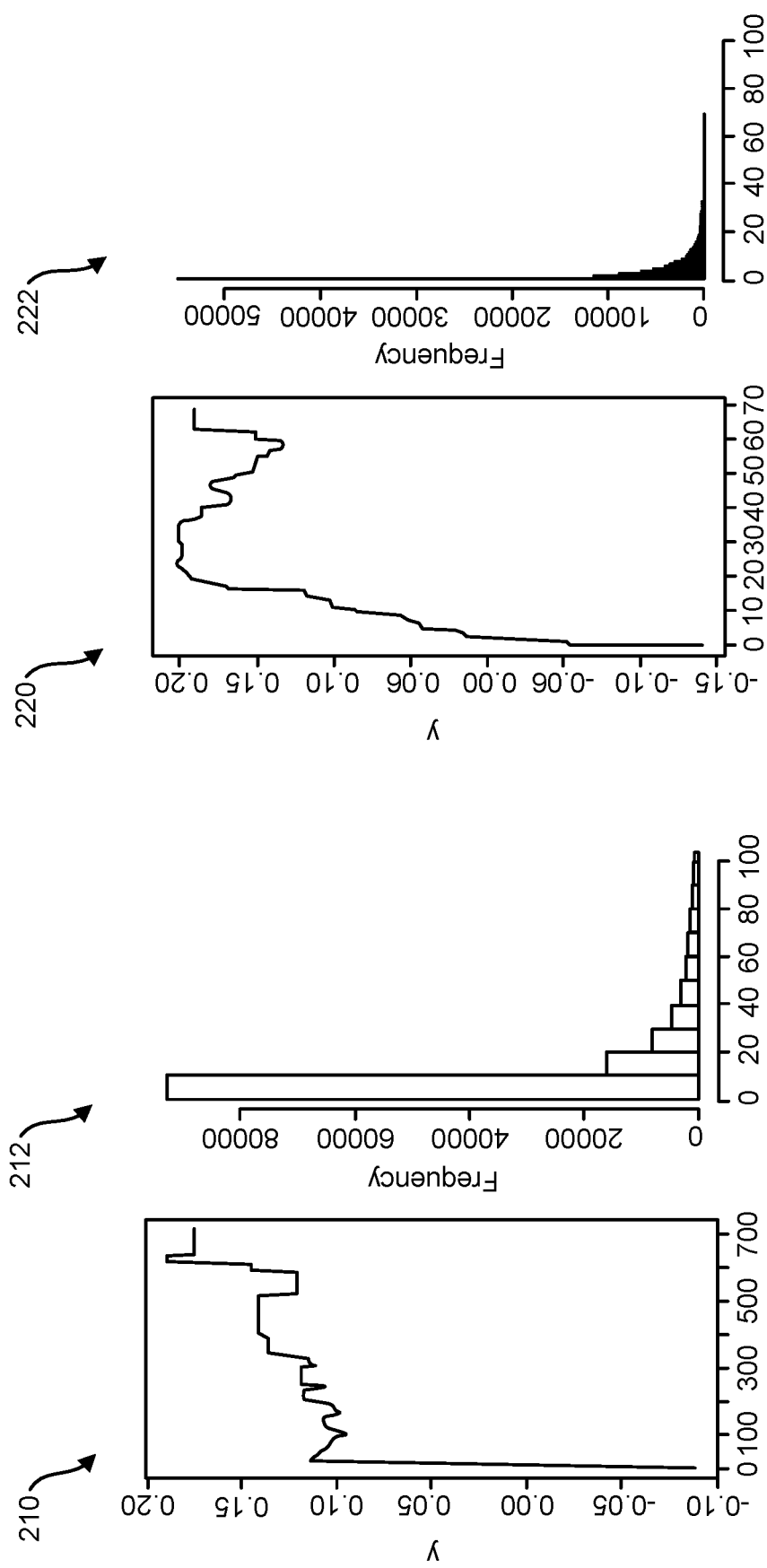

MACHINE LEARNING TECHNIQUES TO IDENTIFY PREDICTIVE FEATURES AND PREDICTIVE VALUES FOR EACH FEATURE

TECHNICAL FIELD

The present disclosure relates to machine learning and, more particularly to, accurately identifying predictive features and predictive values for each feature.

BACKGROUND

Machine learning is the scientific study of algorithms and statistical models that computer systems use to effectively perform a specific task without using explicit instructions, relying on patterns and inference instead. Machine learning algorithms build a mathematical model based on sample data, known as "training data", in order to make predictions or decisions without being explicitly programmed to perform the task. Machine learning algorithms are used in a wide variety of applications, such as email filtering, and computer vision, where it is infeasible to develop an algorithm of specific instructions for performing the task.

Another application in which machine learning algorithms is used is predicting whether users of a piece of data (e.g., software, video) will perform a particular action with respect to the data. One way to make a data-driven prediction is to generate features that correspond to (1) attributes of the users of the data and (2) attributes describing how the users might interact with the data. However, it may be difficult to know, from the model itself, which features are most predictive. Also, many models do not indicate which values of those features are most predictive, unless attributes with large value ranges are divided into multiple, fine-grained features, each corresponding to a small value range. For example, if the number of interactions with a widget of a GUI is an attribute of usage of the data, then, in order to know which feature values are most predictive of the particular action, a model developer typically would have to specify a first feature for one widget interaction, a second feature for two widget interactions, a third feature for three widget interactions, etc. This is a manual and tedious process, especially for attributes with relatively large value ranges. Furthermore, even if there was an automated way to generate features for each possible range, the training data may be too sparse for many or most of the small value ranges, meaning that any weights or coefficients that are "learned" for such features would be inaccurate or "noisy."

Another difficulty in identifying predictive features is that only a strict subset of the predictive attributes are ones that producers of the data can modify. For example, producers of the data that users consume cannot dictate where the users reside (which may be predictive of whether users will perform the action in question) or what type of computing devices users operate when consuming the data (which also may be predictive of whether users will perform the action in question). One way to address this is to train a model only on the attributes that producers can control or influence. However, without the other predictive features, any resulting model is likely to have low precision, low recall, or both.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 2A-2D are example dependency graphs and histograms for different example features, in an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method are described for using machine learning techniques to identify predictive features and predictive values of those features. In one technique, a model is trained based on training data comprising training instances indicating usage of different features of software, such as a program or application. A label of each training instance indicates whether a user performed a particular action with respect to the software. Once trained, the model indicates an importance value for each feature of the model. The model is used to generate a dependency graph for each feature and historical usage data is used to generate a histogram of usage for each feature by multiple users. Based on the dependency graph and the histogram for each feature, a determination is made whether to identify the feature for further processing and, if so, what value of the feature is predictive.

Embodiments improve computer-related technology by leveraging machine learning to identify (1) predictive features regarding different types of usage of software and (2) predicted values for those features. With this information, producers or developers of the software know which features to focus on when modifying the software or informing users of the software how to derive the most value from the software. Without these embodiments, developers of traditional models must guess at what features to include in the model and/or suffer from noisy data if all possible features are included in the model.

Example System

Figure 1:
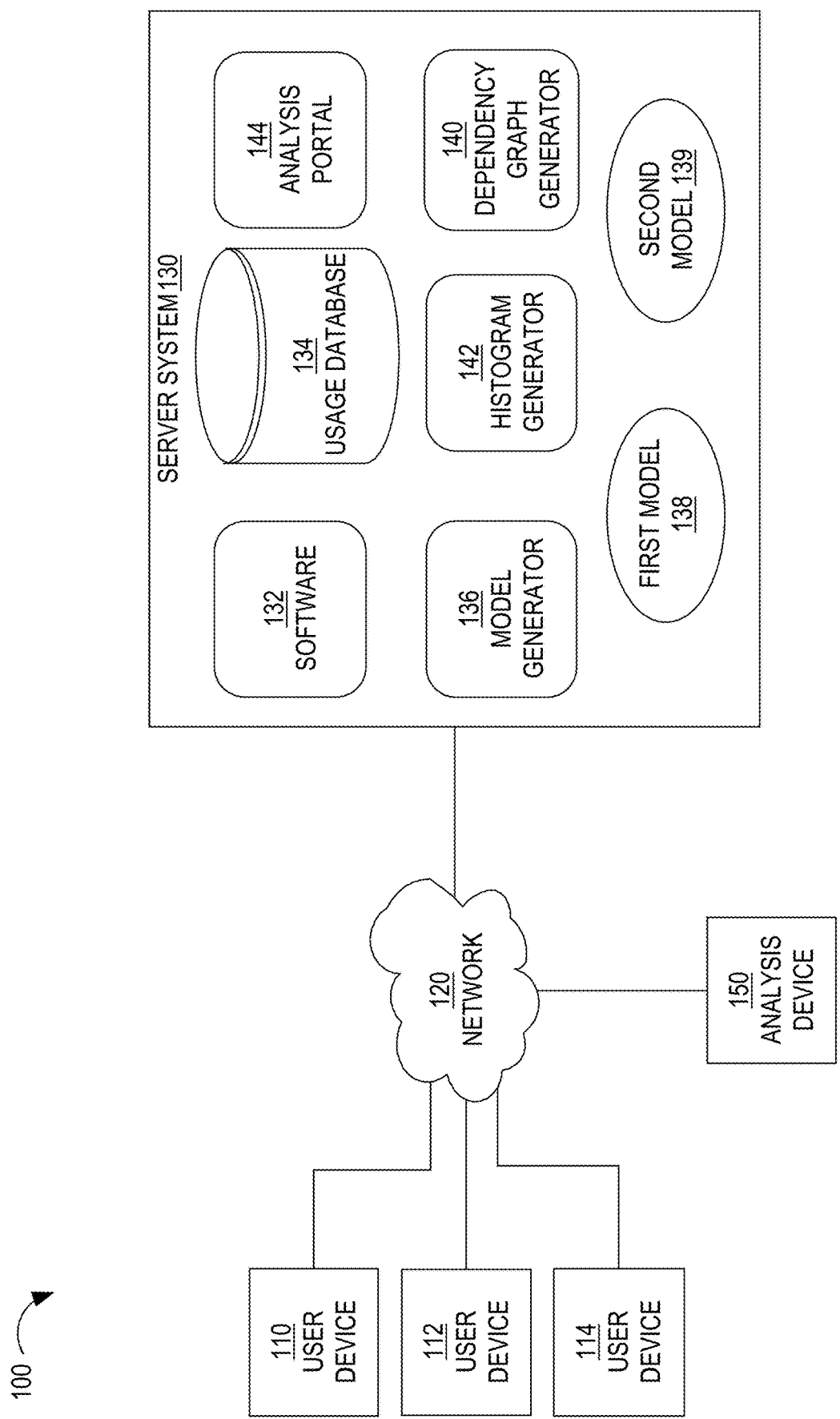
FIG. 1 is a block diagram that depicts an example system for tracking usage of software and identifying features that are predictive of a particular user action, in an embodiment.

FIG. 1 is a block diagram that depicts an example system 100 for tracking usage of software and identifying features that are predictive of a particular user action, in an embodiment. System 100 includes user devices 110-114, a network 120, a server system 130, and an analysis device 150. User devices 110-114 are operated by end-users of software 132 and send data and/or requests to server system 130 over network 120 (such as a local area network (LAN), wide area network (WAN), or the Internet).

While only three user devices 110-114 are depicted, many more user devices may be communicatively coupled to server system 130. Similarly, analysis device 150 is operated by a model developer or a software developer and sends requests to server system 130 over network 120 or another computer network. Although only a single analysis device is depicted, multiple analysis devices may be communicatively coupled to server system 130.

Examples of devices 110-114 and 150 include desktop computers, laptop computers, tablet computers, wearable devices, video game consoles, and smartphones. Also, although only a single network 120 is depicted and described, devices 110-114 and 150 may be communicatively connected to server system 130 through different computer networks.

Server system 130 comprises software 132, a usage database 134, a model generator 136, models 138-139, a dependency graph generator 140, a histogram generator 142, and analysis portal 144. Software 132, model generator 136, dependency graph generator 140, histogram generator 142, and analysis portal 144 may be implemented in software, hardware, or any combination of software and hardware.

Software 132 is usable by user devices 110-114. Software 132 may be a native application that user devices 110-114 individually download, install, and execute. Alternatively, a portion of software 132 may be a web application that is downloaded from server system 130 and executed within a web browser executing on user devices 110-114.

Usage database 134 includes information about usage of software 132 by multiple users. Each time a user performs an action with respect to software 132 or otherwise interacts with features of software 132, that interaction is recorded and stored in usage database 134. Example actions/interactions include selecting a particular feature, selecting a particular view or tab, initiating a search query, viewing a user profile page, viewing a company profile page, scrolling through a feed of content items, selecting a particular type of content item (e.g., a course recommendation or a product recommendation), sending a message to another user, viewing a message from another user, responding to a message from another user, sending a connection request, accepting a connection request, and declining a connection request. For example, a record in usage database 134 may indicate a user/member identifier, a feature of software 132 with which the user interacted, and a timestamp that indicates a date and/or a time of day.

To the extent that different versions of software 132 are developed and made available to users of user devices 110-114, different users may interact with different versions of software 132, even at the same time. However, each version implements similar features or the same set of basic features. Thus, some users of one version of software 132 might not have the option of interacting with a certain feature that is only available through a different version of software 132.

In an embodiment, records of user actions/interactions are aggregated to determine a number of actions of each type of action per user. For example, aggregating multiple records indicating that a particular user sent multiple messages (either to the same or different user) may result in generating sent message data that indicates that the user sent ten messages in the last month or since the user started using software 132.

Model Generator

Model generator 136 generates models 138-139 based on training data (which is described in more detail herein) that is based (at least indirectly) on data stored in usage database 134. Model generator 136 implements (1) a first set of machine learning techniques to generate a first model 138 and (2) a second set of machine learning techniques to generate a second model 139. (Alternatively, a different model generator (not depicted) implements the second set of ML techniques to generate second model 139.) Examples of a machine learning technique in the first set include linear regression, logistic regression, random forest, and support vector machines.

An example of a machine learning technique in the second set is Gradient Boosting. Gradient Boosting (for regression and classification) is a forward learning ensemble method that builds decision trees. A guiding heuristic is that predictive results can be obtained through increasingly refined approximations. "Boosting" is a method of converting weak learners into strong learners. In Gradient Boosting, each new tree is a fit on a modified version of the original data set. Gradient Boosting trains multiple models in a gradual, additive, and sequential manner. At each particular iteration, a new, weak, base-learner model is trained with respect to the error of the whole ensemble learnt so far. Gradient Boosting identifies the shortcomings of weak learners (e.g., decision trees) by using gradients in the loss function, which is a measure indicating how good a model's coefficients are at fitting the underlying data.

A first set of features is defined for first model 138 and a second set of features is defined for second model 139. The first set of features pertain to attributes of the user and/or of the context of the action, such as time of day, day of the week, type of computing device (e.g., laptop, smartphone, desktop), type of operating system (e.g., Android, iOS), and display dimensions. Example attributes of the user include job title, employment status, degree earned, academic institution attended, skills listed, job function, job industry, geographic location, number of connections, a product that the user purchased, and an indication of the platform (e.g., mobile or desktop) on which the purchase (if any) was made.

The second set of features pertain to features of software 132 with which users may interact. Example features include number of messages sent, number of messages received, number of messages responded to, number of searches performed, number of search results selected, number of profile page views, number of views of a page indicating who viewed the user's profile, number of notifications selected, number of connection requests sent, number of connection requests received, and number of connection requests accepted.

Another feature in the second set of features is the output from first model 138. This feature allows second model 139 to be more accurate than if second model 139 did not include this feature. To the extent that the first set of features is predictive, that set of features may be reflected in second model 139, such as with a single feature in second model 139.

Training

The training data that model generator 136 uses to generate or train models 138-139 is divided into two sets: one for first model 138 and another for second model 139.

Each set of training data comprises multiple training instances. Each training instance corresponds to a single user and comprises a set of feature values (associated with the user) and a label indicating whether the user performed a particular action. The types (and, optionally, number) of feature values for first model 138 are different than the types (and, optionally, number) of feature values for second model 139. However, the type of label is the same for both models.

A label corresponds to a target variable, which corresponds to an action for which optimization is sought. The target variable is the thing that will be predicted by the to-be-trained model. Examples of actions for which the label may indicate include subscribing to a particular online service (e.g., software 132), renewing a subscription for the service, making a particular purchase, filling out a digital form, providing a positive recommendation or review, and liking or sharing certain content. A label may be limited to one of two values (e.g., 0 or 1) or to non-negative integers (e.g., 0, 1, 2, 3, etc.), or may be any real number (e.g., −1.5, 1.367, etc.), depending on what the target variable is. For example, if the target variable is renewing a subscription, then the possible values for the label may be 0 and 1. As another example, if the target variable is filling out a form and it is possible to fill out only a portion thereof, then a label may be in the range of 0 to 1, where 0.75 may indicate that 75% of the form was filled out.

Each training instance in one set may have a corresponding training instance in the other set. Thus, the number of training instances for first model 138 may be identical to the number of training instances for second model 139, where corresponding training instances pertain to the same user. One way to associate two training instances from different sets is with an entity (e.g., user) identifier or some other identifier that associates (e.g., links) the two training instances. Such an identifier may be stored in each training instance.

Because output from first model 138 is used as input to second model 139, first model 138 is trained first. Once first model 138 is trained (and, optionally, validated using a reserved portion of the training data that was not used to train first model 138), each training instance is input to first model 138, which computes an output or prediction. That output or prediction from an input training instance (to first model 138) becomes a feature value in a corresponding training instance, for second model 139, that corresponds to the input training instance. In this way, the training of second model 139 takes into account, at least indirectly, predictive features from first model 138 so that second model 139 has predictive power and can identify "engaged" users, or users who are likely to perform a particular action with respect to software 132.

Once second model 139 is trained, second model 139 may be invoked to generate output that lists importance or influence values for each feature in the second set of (usage-based) features of the model. In an embodiment, the importance or influence values indicate a relative contribution to each prediction, such that all the relative contributions add up to 100%. The following is an example list that comprises a feature name-influence value pair:

| Feature Name | Relative Influence |
|---|---|
| view_type1_count | 27.60 |
| clicks_type2_count | 23.67 |
| session_metric1 | 19.11 |
| impression_type2_count | 10.30 |
| clicks_type1_count | 6.84 |
| view_type2_count | 5.84 |
| messages_sent | 3.03 |
| impression_type2_count | 2.25 |
| clicks_type1_count | 0.66 |
| messages_received | 0.42 |
| engaged_metric | 0.29 |

One way to produce a list of feature-influence pairs is through a method or function provided by a Gradient Boosting software framework. Invoking the method causes a computation of the improvement in the split-criterion (mean squared error (MSE) for regression) to be performed at each split in each tree. The improvements across all the trees are then averaged. The variables or features with the largest average decrease in MSE are considered most important.

In an embodiment, a feature's influence or importance value must exceed a threshold value in order to be considered for further processing, such as generating a dependency graph as described in more detail below. For example, a feature's relative influence must be greater than 1.0 in order to be considered as a top feature candidate. Otherwise, the feature is ignored and will not be considered a top feature candidate. In order to be considered a top feature (and not just a candidate), additional processing may be required, such as analyzing a dependency graph and/or a histogram, as described in more detail below.

In an embodiment, multiple models for which top features are identified are generated. For example, a third model (not depicted) is generated in addition to second model 139. For example, second model 139 is generated for users of software 132 who are under a trial period, while the third model is generated for users of software 132 who have already subscribed (e.g., paid for a subscription) and are candidates for renewing the subscription. The two groups of users may have different usage patterns. For example, users who subscribe after a trial period are referred to as "survivors" and may interact with software 132 in one way that indicates a survivor "pattern," while users who renew their subscription to software 132 are referred to as "renewers" and may interact with software 132 in another way that indicates a renewer "pattern." Also, different sets of features may be available to each type of a user. For example, subscribers may have access to a feature that is not available to users who are under a trial period. Thus, second model 139 may be generated for survivor candidates (based on training instances generated from usage records pertaining to users of that type of candidate) and the third model is generated for renewer candidates (based on training instances generated from usage records pertaining to users of that type of candidate). Thus, in this example, there may be two pairs of models: a first pair similar to first model 138 and second model 139, and a second pair similar to first model 138 and the third model, but where the training instances are different and even the features of the respective pairs might be different.

Dependency Graph Generator

Dependency graph generator 140 generates, using second model 139, a dependency graph for each of one or more features of second model 139. A dependency graph may be generated by a Gradient Boosting software package that calculates the probability for a certain class given different values of features, such as the probability of "survival" given different messages sent, and draws the dependency graph. The "certain class" refers to different values of possible outcomes that are being predicted. The values of a single feature are changed here to generate a dependency graph for the feature of interest. Then, another feature is considered and the steps are repeated to generate another dependency graph for the other feature.

Each dependency graph (an example of which is a partial dependency plot) depicts a relationship between the number of instances of a particular user interaction and a likelihood of a user performing a particular action in a set of one or more actions, such as subscribing to an online service or purchasing a particular item.

Figures 2C, 2D:
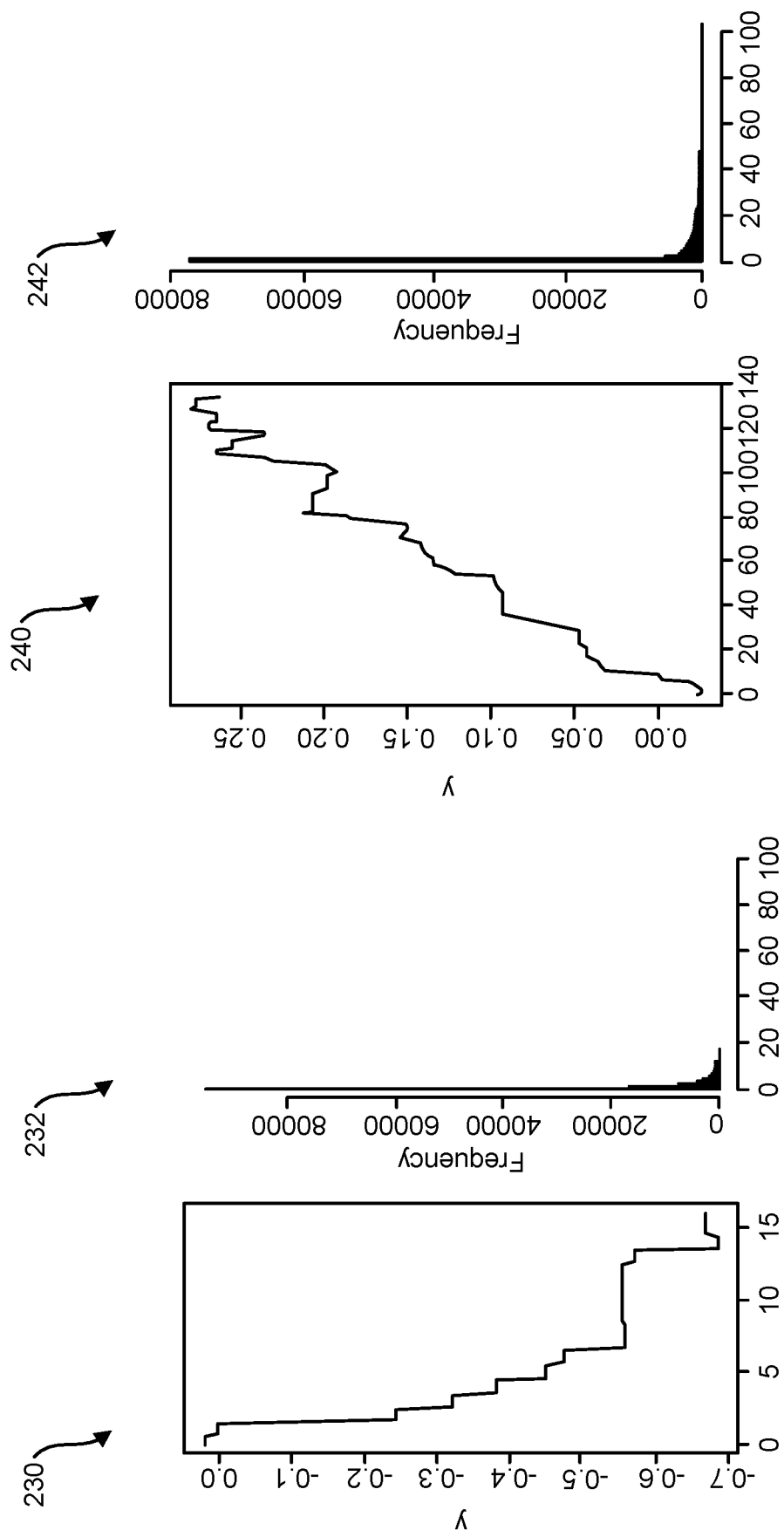

FIGS. 2A-2D are example dependency graphs for different example features, in an embodiment. FIG. 2A is a dependency graph 210 that pertains to the feature of other users viewing the profiles of users of software 132. As the number of such profile views increases, the likelihood of the user of software 132 performing a particular action (e.g., subscribing to, or renewal a subscription to, software 132) generally increases. The line may represent the average change in the prediction as the feature value in question varies while holding other variables or features constant. This is done by holding all variables constant for each observation in the training data set but then applying the unique values of the feature in question for each observation. The prediction is then averaged across all the observations.

FIG. 2B is a dependency graph 220 that pertains to the feature of users of software 132 viewing a page that lists the identity of others who have viewed the users' profiles. Such views are referred to as Who Viewed My Profile (WVMP). As the number of page views of WVMP increases, the likelihood of users of software 132 performing the particular action generally increases, at least from 0 to approximately 30.

FIG. 2C is a dependency graph 230 that pertains to the feature of users of software 132 selecting, or clicking on, individuals who viewed the users' profiles. As the number of such clicks increase, the likelihood of users of software 132 performing the particular action decreases. Thus, there is a negative correlation between the usage-based feature and the particular action.

FIG. 2D is a dependency graph 240 that pertains to the feature of a number of impressions of a particular content item (referred to as job insights) to users of software 132. As the number of such impressions increase, the likelihood of users of software 132 performing the particular action increases.

In these examples, simply selecting a feature value that corresponds to the greatest likelihood of users of software 132 performing the particular action would not yield helpful results. For example, in FIG. 2A, the feature value that yields the greatest likelihood is about 625. However, the number of users of software 132 who have experienced that number of views is very small, less than 1% of the users of software 132. Therefore, if that feature value is used to prompt users to perform certain actions with respect to software 132, then very few users of software 132 would benefit. However, a feature value of 10 yields a likelihood of about 12% and the number of users of software 132 who have experienced that number of views is relatively large, as indicated in the histogram of FIG. 2A. Therefore, the feature value of 10 may be selected as the feature value for the corresponding feature, even though the feature value of 625 yields the greatest likelihood. As another example, in FIG. 2D, the feature value that yields the greatest likelihood is about 130 (i.e., less than 1%). Again, however, the number of users of software 132 who have experienced that number of impressions is very small, less than 1% of the users of software 132. A feature value of 30 may yield an acceptable likelihood (e.g., over a pre-defined threshold) while the number of users of software 132 who have experienced at least that number of impressions is greater than 1% and may be greater than another pre-defined threshold.

Histogram Generator

Histogram generator 142 generates, based on data in usage database 134, a (frequency) histogram for each of multiple features of second model 139. FIGS. 2A-2D depict examples histograms 212-242 for the same corresponding features indicated in dependency graphs 210-240. Thus, histogram 212 corresponds to dependency graph 210, histogram 222 corresponds to dependency graph 220, etc.

A histogram indicates, for each bucket corresponding a range of feature values, a number of users of software 132 that are associated with that range of feature values. The range of feature values may be a single value or multiple values. For example, in histogram 212 of FIG. 2A, the feature value is a number range of profile views and the frequency is a number of users of software 132 whose profile was viewed by others (e.g., using software 132 or associated software) a number of times within that number range. As a specific example, about 15,000 users of software 132 had their respective profiles viewed by others between 10 and 20 times. As another example, according to histogram 242 in FIG. 2D, about 6,000 users of software 132 received two job insight impressions. Each feature value range and each count may be determined from the underlying set of training data upon which second model 139 was trained.

In an embodiment, histogram generator 142 generates a histogram that is initially based on individual feature values (i.e., each bucket corresponds to a single feature value) and, based on an analysis of the resulting data, determine whether to create larger-sized buckets, such as a feature value ranges of two, five, ten, or a hundred. For example, one criterion for determining a bucket size is to test each bucket size beginning with one and then increment the bucket size by one if the count of any successive bucket is greater than the count of a previous bucket.

Analysis Portal

Analysis portal 144 allows analysis device 150 to access and/or display dependency graphs generated by dependency graph generator 140 and/or histograms generated by histogram generator 142. Analysis portal 144 may allow analysis device 150 to initiate creation of models 138-139, the dependency graphs, and/or the histograms. For example, analysis portal 144 has access to usage database 134 and allows a user of analysis portal 144 to select an option to generate a model. In response to input received from analysis device 150, analysis portal 144 communicates with model generator 136 to generate models 138-139 or subsequent versions thereof. Analysis portal 144 may allow (e.g., through a user interface) a user to specify or otherwise indicate a date range that a training instance must belong to in order to be used to train a model. Analysis portal 144 may also allow a user to specify which features to include and/or exclude for each of models 138-139.

Analysis portal 144 may also allow a user of analysis device 150 to trigger the generation of dependency graphs and histograms. For example, analysis portal 144 causes one or more user interface elements to be presented that lists one or more models and, optionally, for each model, multiple features. The user interface may allow a user of analysis device 150 to select a single model and, with one or more inputs, cause a dependency graph to be generated for each feature of the selected model. Thus, the number of user inputs may be less than the number of dependency graphs generated. Additionally or alternatively, the user interface may allow a user of analysis device 150 to select a strict subset of features of a model and, with one or more inputs, cause a dependency graph to be generated for each feature in that strict subset. Again, the number of user inputs, once the individual features are selected, may be less than the number of dependency graphs generated using this process.

Generation of each histogram may be automatic with the generation of each dependency graph. For example, if a dependency graph is generated for a feature, then a histogram may be automatically generated for the feature without requiring any additional user input.

Identifying Top Predictive Features and Values

Based on data of a dependency graph and the data of a corresponding histogram, one or more decisions may be made, such as (1) determining whether there is a positive, negative, or neutral correlation between frequency of a feature value and likelihood of users of software 132 performing a particular action (which determination may be made based on the dependency graph alone); (2) determining a value of the feature value that still has broad enough coverage in terms of the number of users who have experienced that value (which determination is based on the corresponding histogram); and (3) excluding one or more features from consideration.

Such determinations of values of different feature values may be made automatically. For example, rules may be established that define what a positive correlation is, what a negative correlation is, and/or what a neutral correlation is. For example, the top N positive peaks in a dependency graph are automatically identified. A positive peak is one where the prediction is positive. In dependency graph 210, there are approximately seven positive peaks, while in dependency graph 230 there is only one positive peak. In an embodiment, a positive peak is only considered if the prediction value is greater than a particular minimum probability threshold value, such as 0.05. If the no positive peak is above the particular minimum probability, then the feature is excluded from consideration. For example, the feature is not considered a top feature and is excluded from being used to determine what data to present to a developer of software 132 and/or an end user of software 132.

Then, for each identified positive peak, the corresponding histogram is consulted to determine a frequency or number of users that are associated with the feature value at that peak. Based on that frequency/number, a coverage ratio is determined that indicates what percentage of all users of software 132 would be affected by that frequency/number. The highest peak that has (or is associated with) a coverage ratio over a particular minimum threshold count or ratio (e.g., 5%) is automatically selected as the value for the corresponding feature. The corresponding feature is referred to as a "top feature." If a positive peak is associated with very low coverage (e.g., lower than the minimum threshold ratio), then the corresponding feature is not considered a top feature and may be ignored for any further processing or consideration.

Example Process

Figure 3:
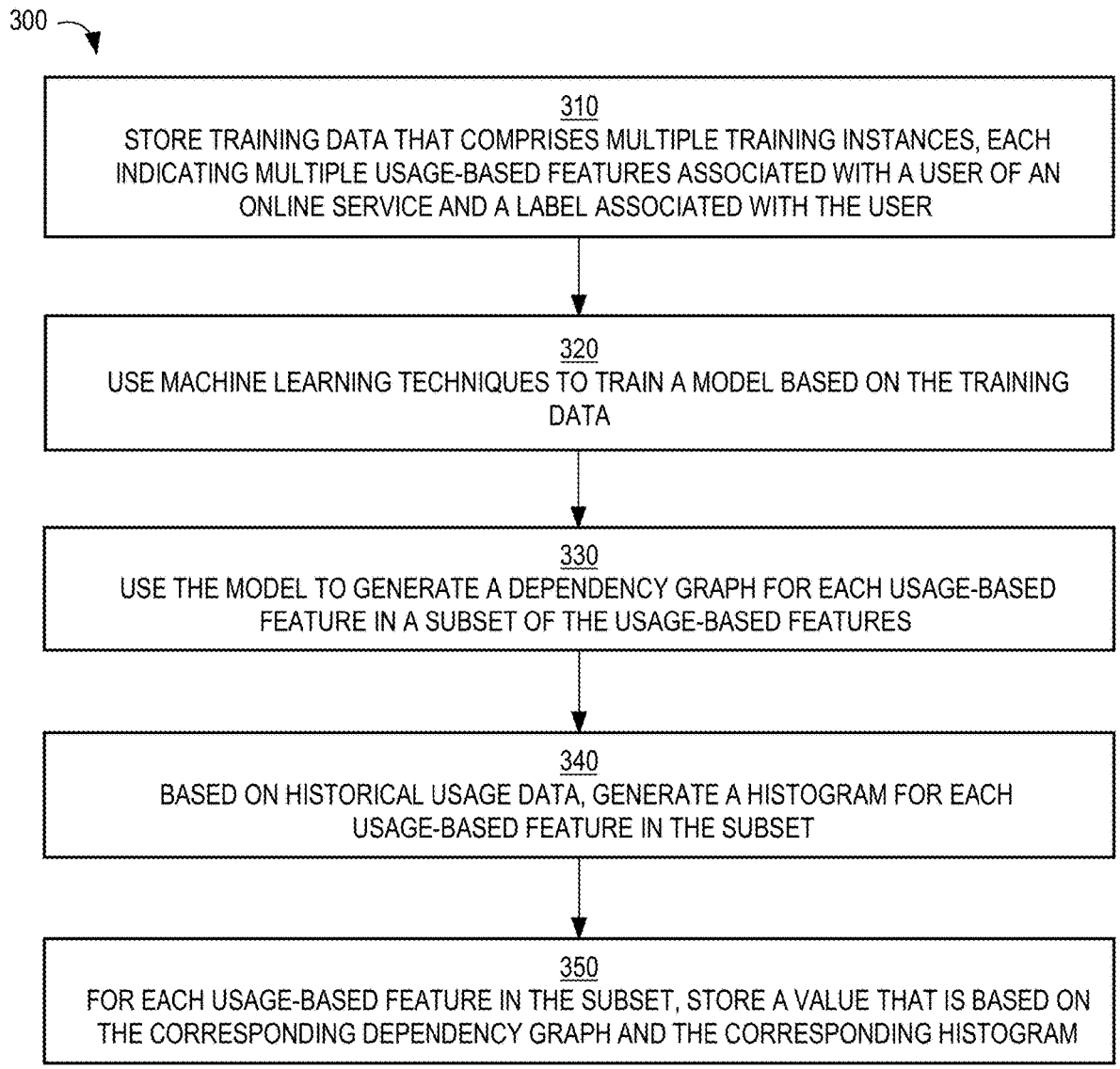
FIG. 3 is a flow diagram that depicts an example process for determining values for one or more features of a model, in an embodiment.

FIG. 3 is a flow diagram that depicts an example process 300 for determining values for one or more features of a model, in an embodiment. Process 300 may be implemented by different components of server system 130.

At block 310, training data is stored that comprises multiple training instances, each indicating multiple usage-based features of a user of an online service and a label associated with the user. Examples of usage-based features include searches performed by the user, views of certain views or webpages, and selections of certain UI elements.

The label indicates whether the user performed a particular action, such as subscribing to the online service after a trial period or renewing an existing subscription to the online service. Block 310 may be performed by model generator 136 or another component (not depicted) of server system 130.

At block 320, one or more machine learning techniques are used to train a model based on the training data. An example of such a machine learning technique is a Gradient Boosting. Once the model is trained, the model indicates an importance value for each usage-based feature. An example of the model is second model 139. Block 320 may be performed by model generator 136.

At block 330, the model is used to generate a dependency graph for each usage-based feature in a subset of the usage-based features. For example, only usage-based features that have an importance value greater than a pre-defined threshold will have a dependency graph generated for them. Block 330 may be performed by dependency graph generator 140.

At block 340, for each usage-based feature in the subset, historical usage data of the online service is used to generate a histogram that indicates, for each of multiple value ranges of the usage-based feature, a number of users of the online service associated with that value range. Block 340 may be performed by histogram generator 142.

At block 350, for each usage-based feature in the subset, a value is stored that is based on (1) the dependency graph associated with that usage-based feature and (2) the histogram associated with that usage-based feature.

The value stored in block 350 may be determined automatically using one or more pre-defined rules.

In a related embodiment, process 300 involves training another model (e.g., first model 138) based on a different set of features that may be predictive of whether users of software 132 will perform the particular action. The output of that other model becomes an input feature to the model of block 320. Thus, the output of the other model becomes an element in a training instance for the corresponding user.

Use Case: Online Service

Developers of online services build features that they believe will provide value to users of the online services. If a developer knew which features attracted users the most to her online service, then the developer would focus on making that feature better and/or would know better how to educate other users about the online service. For example, if users who use an online service (that includes features A and B) tend to use the online service because of feature B, then it would be important to inform other potential users about feature B and place less focus (if any) on feature A. One way to identify such popular features is to consider usage statistics for each feature and determine which feature has been used the most. However, some highly used features may be correlated with negative actions, such as ceasing use of the online service. Additionally, some highly used features may be used by all users of the online service but are not indicative, by themselves, regarding whether users will perform the intended action(s) in question. Furthermore, even if there is a strong intuition about which features are important in the eyes of users, it is not clear what values of those features are sufficient for producing the intended action(s). Thus, usage statistics are many times insufficient to inform developers regarding how to modify the online service or how to educate users and potential users about the online service.

Embodiments described herein offer a data-driven approach to identifying positive predictive features of an online service and determining values that are predictive of a particular action with respect to the online service. The top predictive features are not only identified, but may also be ranked in terms of importance or effect on predicting whether a user will perform the particular action. In the context of online services, embodiments allow developers and others affiliated with an online service to know which features to focus on, whether to improve or as a basis to inform current and future users of the online service. Also, embodiments allow certain data to be automatically identified and sent to computing devices of users based on the top predictive features and online usage history of the users.

Leveraging Top Features and Corresponding Feature Values

Once the top features in terms of predictive power are determined, such knowledge may be leveraged in one or more ways. For example, when informing users who have not used software 132 about software 132 (e.g., through one or more advertising channels), only the top features are referenced. As another example, when new users of software 132 are in a trial period with software 132, such users are informed of the top features through email, another messaging channel, via phone by a service representative, or through software 132 itself, which may be configured to present one or more of the top features in the form of a pop-up. Thus, an on-boarding process for users of software 132 may be updated to focus primarily (or only) on at least a subset of the top features.

In an embodiment, one or more predictive values determined using the dependency graph and/or histogram are used in conjunction with usage statistics of current users of software 132 in tailoring content to those users. For example, a predictive value for a top feature is compared to usage information of each of one or more individual users. For example, if a user of software 132 has used a particular feature less than the predictive value that was determined for that particular feature, then the user is notified/reminded about the particular feature. The notification may come in the form of an email, a text message, an app message, a content item (e.g., ad) in a news feed of the user or on a third-party publisher website, a notification in a notifications tab of software 132, or as a pop-up generated by software 132 itself (i.e., while the user is interacting with software 132). A similar notification may be generated for the user regularly (e.g., daily or every three days) until the number of uses of, or interactions with, the particular feature reaches the predictive value.

In a related embodiment, if there are multiple top features for which a user has not reached the corresponding predictive values, then the top features may be ranked for that user. Thus, the top features may be ranked differently for different users, since different users have different usage history with respect to software 132. One ranking criterion may be the difference of a predictive value and the corresponding usage value of a user. Top features associated with the highest positive differences may be ranked highest or may be ranked lowest. Negative differences may be ignored, since a negative difference indicates that the user's actions (or other users' actions, depending on the feature) have already reached the predictive value.

In an embodiment, a dependency graph and/or histogram is used to identify features pertaining to software 132 to exclude from consideration. For example, a feature might have a negative correlation with a certain set of user actions. Thus, informing users of software 132 about the feature might result in non-desirable actions, such as unsubscribing or not using software 132. As other examples, a feature might have no correlation with the certain set of user actions or a feature has a positive correlation with the certain set of user actions, but the number of users who are actually affected by the feature is relatively low. In both scenarios, it is not worth time or resources to focus on improving that feature or informing users of software 132 about the feature.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
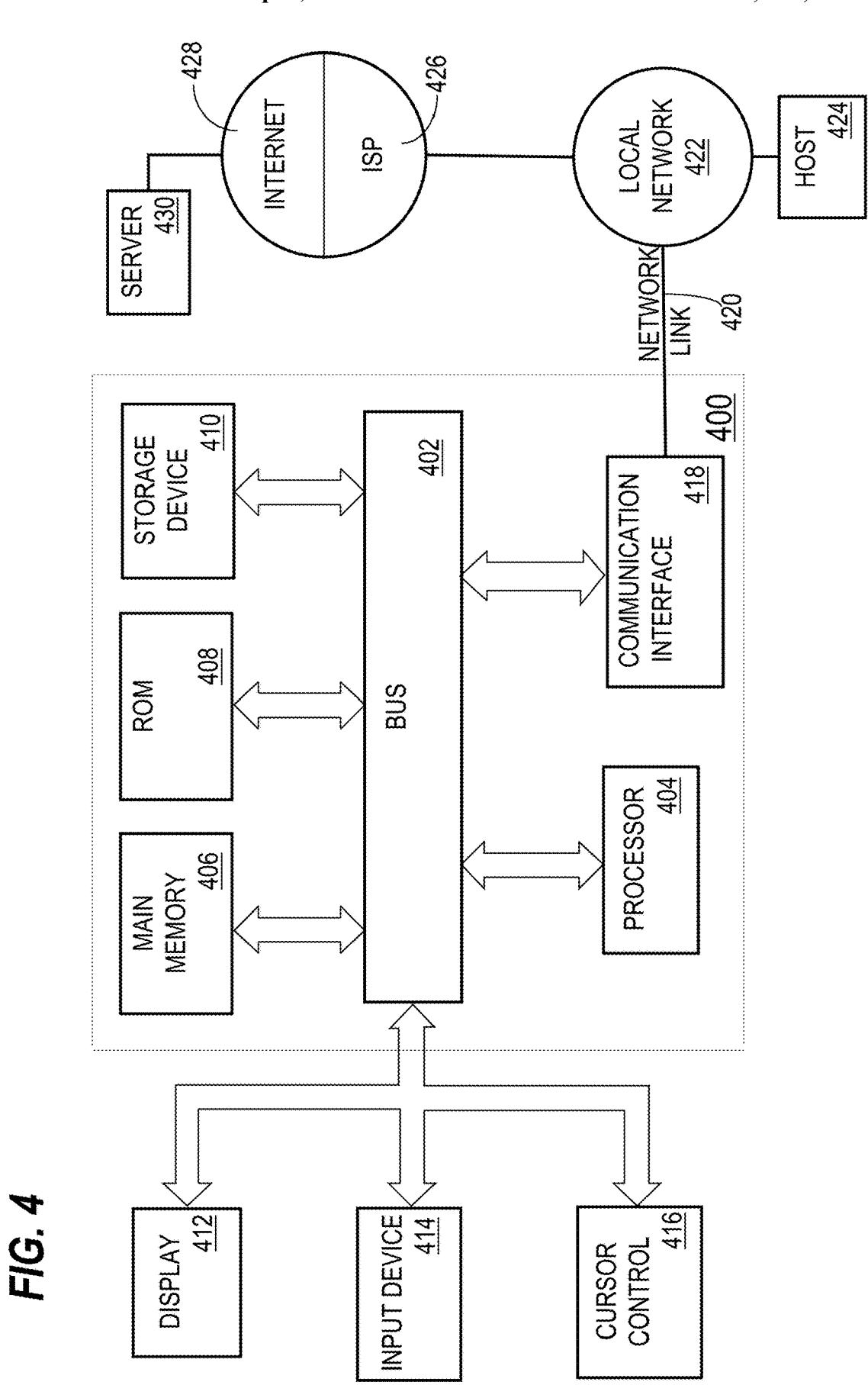
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
storing training data that comprises a plurality of training instances, each of which corresponds to a plurality of usage-based features of an online service by a user and a label associated with the user;
using one or more machine learning techniques to train a model based on the training data, wherein, after training the model, the model includes an importance value for each usage-based feature in the plurality of usage-based features;
for each usage-based feature in a subset of the plurality of usage-based features, using the model to generate a dependency graph that indicates a relationship between different values, within a range of values, of said each usage-based feature and probabilities of users to perform a particular action;
based on historical usage data of the online service, for each usage-based feature in the subset, generating a histogram that indicates, for each sub-range of the range of values of said each usage-based feature, a number of users of the online service associated with said each sub-range;
for each usage-based feature in the subset, selecting an optimized value in the range of values for said each usage-based feature that is based on (1) the dependency graph associated with said each usage-based feature and (2) the histogram associated with said each usage-based feature;

identifying, for a first user of the online service, a first usage value that indicates a level of usage of a first usage-based feature in the subset;

performing a comparison between the first usage value and a first optimized value of the first usage-based feature;

based on the comparison, determining whether to present first data about the first usage-based feature to the first user.

2. The method of claim 1, wherein the training data is second training data, the plurality of training instances is a second plurality of training instances, the model is a second model, the method further comprising:

storing first training data that comprises a first plurality of training instances, each of which corresponds to a first plurality of features and a first label associated with a corresponding user;

wherein the first plurality of features are different than the plurality of usage-based features;

using one or more second machine learning techniques to train a first model based on the first training data;

after training the first model and prior to training the second model, for each training instance in the second plurality of training instances:
   using the first model to generate an output;
   inserting the output into said each training instance.

3. The method of claim 2, wherein the first plurality of features includes one or more features of users, computing devices, or temporal context.

4. The method of claim 2, further comprising:

storing association data that associates each training instance in the second training data with a single training instance in the first training data;

wherein using the second model to generate the output comprises:
   based on the association data, identifying a training instance in the second training data that corresponds to said each training instance in the first plurality of training instances;
   inputting the training instance into the second model to generate the output.

5. The method of claim 2, wherein the one or more machine learning techniques are one or more first machine learning techniques that are different than the one or more second machine learning techniques.

6. The method of claim 1, further comprising, prior to generating the dependency graph:
   for each usage-based feature in the plurality of usage-based features:
      comparing the importance value of said each usage-based feature with a threshold value;
      adding said each usage-based feature to the subset if the importance value is greater than the threshold value.

7. The method of claim 1, wherein the model is a gradient boosting decision tree.

8. The method of claim 1, further comprising:

in response to determining to present, to the first user, the first data about the first usage-based feature and while the first user is using the online service, causing the online service to present the first data to the first user.

9. The method of claim 1, further comprising:

storing a minimum probability threshold that is associated with one or more dependency graphs generated using the model;

storing a minimum user threshold that is associated with one or more histograms generated based on the historical usage data;

wherein storing the value comprises:
   based on the dependency graph for said each usage-based feature, identifying one or more probabilities that are greater than the minimum probability threshold and that are associated with a set of one or more values of said each usage-based feature;
   based on the histogram for said each usage-based feature, for each probability of the one or more probabilities, identifying a first number of users based on the minimum user threshold, wherein the users in the first number of users are of the online service and are associated with one or more values in the set of one or more values.

10. A method comprising:

storing training data that comprises a plurality of training instances, each of which corresponds to a plurality of usage-based features of an online service by a user and a label associated with the user;

using one or more machine learning techniques to train a model based on the training data, wherein, after training the model, the model includes an importance value for each usage-based feature in the plurality of usage-based features;

for each usage-based feature in a subset of the plurality of usage-based features, using the model to generate a dependency graph that indicates a relationship between different values, in a range of values, of said each usage-based feature and probabilities of users to perform a particular action;

based on historical usage data of the online service, for each usage-based feature in the subset, generating a histogram that indicates, for each sub-range in the range of values of said each usage-based feature, a number of users of the online service associated with said each sub-range;

storing a minimum probability threshold that is associated with the dependency graph;

storing a minimum user threshold that is associated with the histogram;

identifying one or more usage-based features in the plurality of usage-based features to exclude from consideration based on the minimum probability threshold or the minimum user threshold;

wherein the method is performed by one or more computing devices.

11. The method of claim 10, further comprising:

for a first usage-based feature in the subset, identifying a first value for the first usage-based feature;

identifying a first usage value for a first user of the online service;

performing a comparison between the first value and the first usage value;

based on the comparison, determining whether to present first data about the first usage-based feature to the first user.

12. One or more storage media storing instructions which, when executed by one or more processors, cause:

storing training data that comprises a plurality of training instances, each of which corresponds to a plurality of usage-based features of an online service by a user and a label associated with the user;

using one or more machine learning techniques to train a model based on the training data, wherein, after training the model, the model includes an importance value for each usage-based feature in the plurality of usage-based features;

for each usage-based feature in a subset of the plurality of usage-based features, using the model to generate a dependency graph that indicates a relationship between different values, in a range of values, of said each usage-based feature and probabilities of users to perform a particular action;

based on historical usage data of the online service, for each usage-based feature in the subset, generating a histogram that indicates, for each sub-range in the range of values of said each usage-based feature, a number of users of the online service associated with said each sub-range;

for each usage-based feature in the subset, selecting an optimized value in the range of values for said each usage-based feature that is based on (1) the dependency graph associated with said each usage-based feature and (2) the histogram associated with said each usage-based feature;

identifying, for a first user of the online service, a first usage value that indicates a level of usage of a first usage-based feature in the subset;

performing a comparison between the first usage value and a first optimized value of the first usage-based feature;

based on the comparison, determining whether to present first data about the first usage-based feature to the first user.

13. The one or more storage media of claim 12, wherein the training data is second training data, the plurality of training instances is a second plurality of training instances, the model is a second model, wherein the instructions, when executed by the one or more processors, further cause:

storing first training data that comprises a first plurality of training instances, each of which corresponds to a first plurality of features and a first label associated with a corresponding user;

wherein the first plurality of features are different than the plurality of usage-based features;

using one or more second machine learning techniques to train a first model based on the first training data;

after training the first model and prior to training the second model, for each training instance in the second plurality of training instances:
 using the first model to generate an output;
 inserting the output into said each training instance.

14. The one or more storage media of claim 13, wherein the first plurality of features includes one or more features of users, computing devices, or temporal context.

15. The one or more storage media of claim 13, wherein the instructions, when executed by the one or more processors, further cause:

storing association data that associates each training instance in the second training data with a single training instance in the first training data;

wherein using the second model to generate the output comprises:
 based on the association data, identifying a training instance in the second training data that corresponds to said each training instance in the first plurality of training instances;
 inputting the training instance into the second model to generate the output.

16. The one or more storage media of claim 13, wherein the one or more machine learning techniques are one or more first machine learning techniques that are different than the one or more second machine learning techniques.

17. The one or more storage media of claim 12, wherein the instructions, when executed by the one or more processors, further cause, prior to generating the dependency graph:

for each usage-based feature in the plurality of usage-based features:
 comparing the importance value of said each usage-based feature with a threshold value;
 adding said each usage-based feature to the subset if the importance value is greater than the threshold value.

18. The one or more storage media of claim 12, wherein the model is a gradient boosting decision tree.

19. The one or more storage media of claim 12, wherein the instructions, when executed by the one or more processors, further cause:

in response to determining to present, to the first user, the first data about the first usage-based feature and while the first user is using the online service, causing the online service to present the first data to the first user.

20. The one or more storage media of claim 12, wherein the instructions, when executed by the one or more processors, further cause:

storing a minimum probability threshold that is associated with one or more dependency graphs generated using the model;

storing a minimum user threshold that is associated with one or more histograms generated based on the historical usage data;

wherein storing the value comprises:
 based on the dependency graph for said each usage-based feature, identifying one or more probabilities that are greater than the minimum probability threshold and that are associated with a set of one or more values of said each usage-based feature;
 based on the histogram for said each usage-based feature, for each probability of the one or more probabilities, identifying a first number of users based on the minimum user threshold, wherein the users in the first number of users are of the online service and are associated with one or more values in the set of one or more values.

* * * * *